United States Patent
Sohnemann

(10) Patent No.: US 7,618,479 B2
(45) Date of Patent: Nov. 17, 2009

(54) ADSORBER FOR ADSORBING HYDROCARBON VAPORS FROM RETURN FLOWS THROUGH AN INTAKE TRACT OF AN INTERNAL COMBUSTION ENGINE

(75) Inventor: Jens Sohnemann, Landshut (DE)

(73) Assignee: Mann & Hummel GmbH, Ludwigsburg (DE)

( * ) Notice: Subject to any disclaimer, the term of this patent is extended or adjusted under 35 U.S.C. 154(b) by 315 days.

(21) Appl. No.: 11/097,361

(22) Filed: Apr. 4, 2005

(65) Prior Publication Data

US 2005/0223894 A1  Oct. 13, 2005

(30) Foreign Application Priority Data

Apr. 14, 2004  (DE)  .................. 10 2004 018 184

(51) Int. Cl.
F02M 33/02  (2006.01)
B01D 53/04  (2006.01)

(52) U.S. Cl. ........................................ 95/146

(58) Field of Classification Search ............. 96/147, 96/154; 95/143, 146; 55/385.3; 123/518, 123/519
See application file for complete search history.

(56) References Cited

U.S. PATENT DOCUMENTS

| | | | | |
|---|---|---|---|---|
| 2,038,071 A * | 4/1936 | Wilhelm | ................ | 96/118 |
| 3,678,663 A * | 7/1972 | Hansen | ................ | 96/141 |
| 4,259,092 A | 3/1981 | Matsuo et al. | | |
| 4,261,717 A * | 4/1981 | Belore et al. | ................ | 96/112 |
| 4,289,513 A * | 9/1981 | Brownhill et al. | ............ | 96/135 |
| 4,386,947 A * | 6/1983 | Mizuno et al. | ................ | 96/137 |
| 5,603,753 A * | 2/1997 | Krull et al. | ................ | 96/121 |
| 5,750,026 A * | 5/1998 | Gadkaree et al. | ......... | 210/502.1 |
| 7,021,296 B2 * | 4/2006 | Reddy | ................ | 123/520 |
| 7,276,098 B2 * | 10/2007 | Koslow | ................ | 55/385.3 |
| 2002/0124732 A1 * | 9/2002 | Hara et al. | ................ | 96/131 |
| 2002/0192512 A1 * | 12/2002 | Dichiara et al. | ............ | 428/704 |
| 2003/0145732 A1 | 8/2003 | Leffel et al. | | |
| 2005/0081717 A1 * | 4/2005 | Meiller et al. | ................ | 96/154 |
| 2006/0162704 A1 * | 7/2006 | Hagler et al. | ................ | 123/518 |

FOREIGN PATENT DOCUMENTS

DE  197 01 658 A1  7/1998
EP  1 084 979 A1  1/2001

OTHER PUBLICATIONS

European Search Report, application No. 05102651.6, dated Jul. 7, 2005.

* cited by examiner

*Primary Examiner*—Frank M Lawrence
(74) *Attorney, Agent, or Firm*—Crowell & Moring LLP

(57) ABSTRACT

An adsorption element for adsorbing gases and vapors from the gas atmosphere in a gas stream in an intake tract of an internal combustion engine, in which the gas atmosphere is present in a flow cross section of the intake tract. The adsorption element has free-flow channels through which the gas stream is passed. The adsorption element includes at least one adsorption layer, and the free-flow channels are formed by at least one spacer element, and the spacer element is arranged between adsorption layers.

8 Claims, 2 Drawing Sheets

ADSORBER FOR ADSORBING HYDROCARBON VAPORS FROM RETURN FLOWS THROUGH AN INTAKE TRACT OF AN INTERNAL COMBUSTION ENGINE

BACKGROUND OF THE INVENTION

This invention relates to an adsorption element for adsorption of gases and vapors from the gas atmosphere in the gas stream of the intake tract of an internal combustion engine, and to a method for adsorbing gases such as hydrocarbon vapors in return flows from an internal combustion engine.

Adsorption elements are used for air intake systems of internal combustion engines, for example. The adsorption elements here have the function of adsorbing hydrocarbons which threaten to escape from the intake system after the engine is shut down. When the engine is subsequently operated again, the hydrocarbons are again desorbed from the adsorption element into the air intake stream and are then burned in the engine which restores the capacity of the adsorption element.

For example, U.S. Pat. No. 5,914,294 (=CA 2,367,031) discloses a monolith which adsorbs chemical constituents from a gas stream. This is achieved by bringing the gas stream into direct contact with an activated carbon layer in its flow through the monolith. One disadvantage of this type of extruded or pressed monolith adsorption element is that they are preferably manufactured from powdered activated carbon and a binder and therefore have a brittleness which leads to the risk of individual fragments flaking off. In addition, the adsorption capacity is reduced by the fact that the binder partially blocks the pore system of the adsorption medium. When using monoliths as the adsorption element, additional filter elements are therefore necessary to retain particles of the adsorption element that have become detached and prevent them from entering the gas stream. The incorporation of additional filter inserts means an increased complexity and increases the flow resistance in the intake tract. Thus, despite the efforts of the prior art, there has remained a need for improved devices and methods for adsorbing hydrocarbon vapors from return flows in the intake tract of an internal combustion engine.

SUMMARY OF THE INVENTION

It is an object of the present invention to provide an improved adsorber element for adsorbing hydrocarbon vapors from the intake tract of an internal combustion engine.

Another object of the invention is to provide an adsorption element which achieves a maximum adsorption capacity with a minimum flow resistance.

A further object is to provide an improved method of preventing atmospheric pollution from hydrocarbon vapors from the intake tract of an internal combustion engine.

These and other objects are achieved in accordance with the present invention by providing an adsorption element for disposition in a flow cross section of an intake tract of an internal combustion for adsorbing gases and vapors from a gas stream passing through the intake tract, the adsorption element having free-flow channels through which the gas stream passes, and the adsorption element being comprised of at least one adsorption layer and at least one spacer element arranged between adsorption layers to form the free-flow channels.

In accordance with a further aspect of the invention the objects are achieved by providing a method of preventing atmospheric pollution by hydrocarbons from a return flow of gases through an intake tract of an internal combustion engine comprising providing an adsorption element in the intake tract, the adsorption element having free flow channels with channel walls formed at least partially by an adsorption layer or by a spacer element open to gas diffusion arranged adjacent an adsorption layer; adsorbing hydrocarbon vapors on the adsorption layer from a return flow of gases from the engine through the intake tract; and desorbing adsorbed hydrocarbons from the adsorption layer into an intake air stream drawn through the intake tract to the internal combustion engine when the engine is operating and combusting the desorbed hydrocarbons in the engine.

The adsorption element according to the invention is comprised of at least one adsorption layer and a spacer element which forms channels with free flow between the adsorption layers. The spacer element may be formed by a flat or pleated layer, so that there is always a contact surface with the adsorption layer. It is also possible to use a perforated area. A nonwoven web or a paper is usually recommended as the choice of material for the spacer element. However, a synthetic resin (i.e., plastic) element or a metallic element may also be used, in which case a grid-shaped or highly perforated layer is especially recommended when synthetic resin or metal is chosen as the material. The free flow cross section between the adsorption layers may also be achieved by folding, e.g., by zigzag folding of the spacer element. If the adsorption element is to be constructed in the shape of a block, then multiple adsorption layers and spacer elements must be layered one above the other. Alternatively, the adsorption layer may also be layered in folds and the spacer element in a planar form may be situated in between the folds. The points of contact between the spacer element and the adsorption element may be mounted under a slight compression in order to fix them in place or they may also be joined together by adhesive.

The adsorption element may suitably be installed, for example, in a filter housing or in a gas duct. The adsorption element itself may be mounted at the desired installation site by adhesive bonding or by other joining methods such as fusion welding. Thus, the adsorption element may be fixedly and permanently installed as a lifetime component.

Alternatively, the adsorption element may be constructed as a replaceable insert, in which case gaskets must be attached or installed at the installation site or on the adsorption element.

The flow cross section may be adapted to the volume flow by adjusting the number and length of the layers, the height of the folds and/or the height of the possible pleating, whereby the thickness and intensity of the adsorption material must also be adapted to the volume flow that occurs. The flow cross section is not necessarily defined and a labyrinthine flow cross section may also develop, for example, due to irregular pleating.

The advantageous low-pressure resistance is achieved due to the fact that the gas stream does not pass through the adsorption layer but instead merely flows past the adsorption layer. Since flow through the adsorption layer can be prevented, this also yields a definite lower mechanical stress of the adsorption medium, so the risk of separation of particles of the adsorption layer is definitely reduced. Due to the fact that no particles that would endanger the engine are entrained in the air stream, downstream filtration of the gas stream may thus also be omitted. Because of the lower burden on the adsorption medium, it is possible to lengthen the service life while maintaining the same dimensions or to reduce the size of the adsorption element while keeping the same service life.

The adsorption process takes place during the return flow and/or diffusion of the crank case gases and the unburned hydrocarbons that are vaporized by the fuel injectors and walls when the engine is shut down. Therefore the unburned hydrocarbons have enough time to diffuse to the surface of the adsorption layer and be adsorbed there.

In comparison with flow through the adsorption layer, desorption takes place much more slowly with the inventive adsorption element because the driving force for desorption is reduced in the overflow situation. Accordingly, desorption of hydrocarbons into the intake stream is delayed in the critical engine starting phase so that the sensitive lambda probe is protected and the risk of emission of unburned hydrocarbons with the exhaust gas stream is minimized. The gas stream in the adsorption phase is only minimal compared to the gas stream during engine operation. Therefore the hydrocarbons are desorbed much more slowly into the gas stream during the desorption phase than during the adsorption phase. Media which are known from other installation situations that are exposed to high mechanical stresses may be used as the adsorption layers. When these media are used, it is not necessary to perform complex release tests.

In one advantageous embodiment of this invention, the spacer element is formed by a layer of plastic or paper, which may be folded, pleated, perforated or arranged in a flat area between the adsorption layers, whereby in the case of a stacked arrangement of the adsorption element, the individual layers may have the same size and shape. The peripheral contour of the adsorption element may conversely be determined by the sizes and shapes of individual layers stacked one upon the other. This has the advantage that even polygonal peripheral geometries of the adsorption element are possible and homogeneous channel cross sections are achieved over the entire cross section of the element. In addition, this offers the possibility of constructing one layer of the spacer element to be greater in length and thus using the longer spacer element as an envelope for the adsorption element by wrapping the projecting area of the spacer element around the adsorption element.

Another embodiment of this invention is obtained by using a layer open to diffusion as a spacer element between the adsorption layers. As used herein, the phrase "open to diffusion" means that the gas stream can penetrate through the material of the spacer element. This makes it possible to cover the adsorption layer on both sides with a spacer layer open to diffusion. The adsorption and desorption may thus take place through the layer open to diffusion. This also allows packing of the adsorption layers between the spacer layers. In this variant, entrainment of particles in the gas stream is advantageously prevented and/or ruled out, while adsorption of hydrocarbons through the medium is still ensured as it was previously.

According to another advantageous embodiment, the adsorption elements are formed of zeolite and/or activated carbon which may be secured in a suitable manner in or on a carrier material such as paper or a nonwoven web, e.g., in the form of active fibers. If they are strong enough, active fibers may also function as the adsorption layer even without a carrier. The various adsorption properties of the materials may also be combined and thus several adsorber media may be used together in one absorption element. This makes it possible to adapt the adsorption properties of the media to the contaminant load of the gas stream.

An advantageous embodiment of the adsorption element is obtained by jointly coiling the adsorption layer and the spacer layer. At least one of these layers must be pleated. In the wound state, the pleating forms the channels through which there is free flow and ensures the spacing from the opposite layer. The pleating may be provided either on the adsorption layer and/or on the spacer layer. To secure the rolled-up element, it is possible to cut the spacer element to a longer length and glue the protruding end on the periphery. An advantage of this embodiment is its simple and reliable production process.

In another advantageous embodiment, the end faces of the adsorption medium are sealed. This may be achieved with a thermoplastic, a thermoset plastic or a multicomponent adhesive. The application of a fusible carrier layer on the end face is another possibility of sealing. The end faces may be sealed on the prefabricated layers cut to size or the sealing may be performed only after completing the adsorption layers with the spacer layers. In particular in the case of more brittle adsorption layers, sealing after assembly is possible because after assembly there is usually no longer any bending of the layers. Sealing prevents the adsorber media particles from escaping from the end faces and thus assures that the intake system will be free of residue.

Another advantageous embodiment of this invention is obtained by molding individual adsorption elements into pockets provided in the spacer layers. The pocket shape may be embossed in a spacer layer or may also be formed by the corrugated form of the spacer layer. In both arrangements, the adsorption medium is placed in the pockets and then the pockets are sealed by a flat spacer layer or by another corrugated spacer layer. Due to the shaping of the pockets, a pleated layer is formed in both cases, resulting in a free flow cross section when stacked or rolled up or in a round closed arrangement in the adsorption element. The end faces of the individual pockets may be closed and sealed by the methods mentioned above. In this embodiment of the invention it is advantageously also possible to introduce granular or molded activated carbon into the sealed pockets of paper. Problems with binders blocking the pore system do not occur with this arrangement because the additional binders may be largely omitted.

In accordance with another advantageous embodiment, a supporting layer is arranged around the adsorption element enclosing all the layered layers. The supporting layer may be formed, for example, by layers of the spacer element that are cut oversized and are coiled around the periphery of the adsorption element. The filter element may also be enclosed by a housing made of plastic or metal, surrounding the element directly above the layers or comprising an intermediate supporting layer. For example, a gasket which ensures a reliable separation between the oncoming flow side and the outflow side may be mounted on this filter housing. A filter housing or a supporting layer surrounding the element imparts additional stability to the adsorption element. The adsorption element may be designed as a lifetime component under the usual use conditions. However, this design of the element facilitates replacement of the adsorption element in an installation space provided for this purpose, e.g., in an air filter element or as an inline arrangement on an air duct connection. In the case of an inline arrangement of the adsorption element, this also facilitates arranging the element in a branch of the air guidance system, where it can be triggered separately by a valve control. This arrangement makes it possible to activate and/or deactivate the element in different operating phases of the internal combustion engine, in which case the adsorption element must be activated when the engine is at a standstill.

Another advantageous embodiment of the adsorption element is derived from the choice of material for the adsorption medium. With the adsorption media conventionally used in the past, the adsorption capacity declines with a rise in temperature. This property has a very negative effect on the actual function of the element because when the engine is shut down, the entire engine space and thus the adsorption element heat up due to the lack of air convection. This problem can be compensated by using so-called phase change material which ensures that the adsorption capacity will remain constant even when there is a rise in temperature. This achieves an advantageous adaptation of the capacity of the adsorption element to the ambient temperature conditions.

In the method of the invention for adsorbing gases and vapors from the gas atmosphere in the gas stream of the intake tract of an internal combustion engine, the gas is passed through free-flow channels of the adsorption element. In this case the gas stream need not pass through the adsorption medium but instead is merely guided along the adsorption medium. The gas stream may also be separated from the adsorption medium by a perforated spacer element or spacer element open to diffusion. An adsorption capacity is nevertheless ensured by the fact that the volume flow during the adsorption phase is greatly minimized in comparison with the desorption phase. It is advantageous in this method that the main gas stream need not flow through the adsorption medium. Therefore, the flow resistance and thus the pressure drop are greatly reduced in comparison with traditional adsorption methods.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which corresponding parts are identified by the same reference numerals. In the drawings.

DETAILED DESCRIPTION OF PREFERRED EMBODIMENTS

Figure 1:
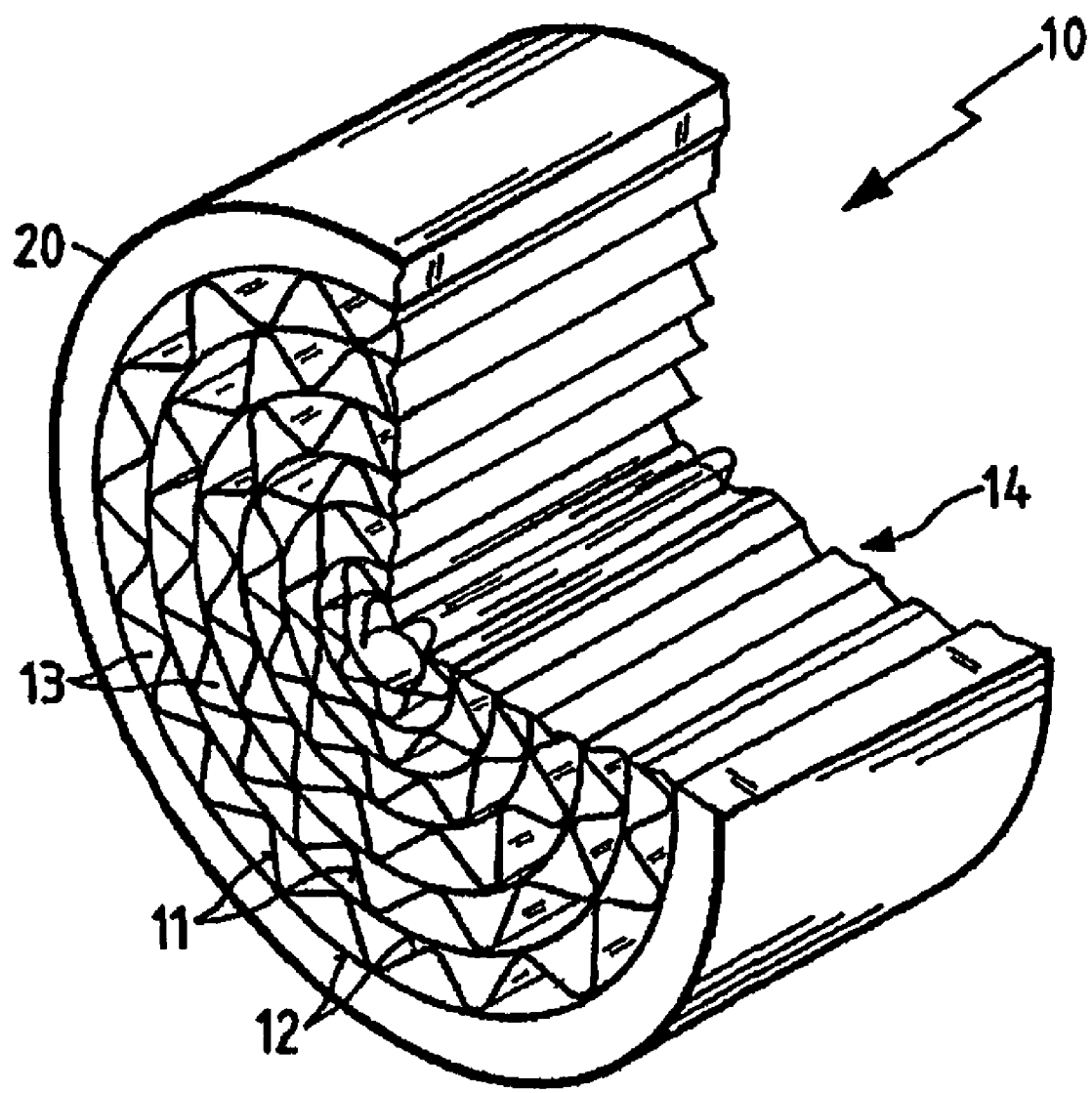
FIG. 1 is a perspective, partially sectional view of a rolled-up adsorption element.

FIG. 1 shows an adsorption element 10 which comprises an adsorption layer 12 and a spacer element 11. In the illustrative embodiment shown here, the spacer element 11 is constructed with pleating and/or corrugations, with one layer of the spacer element 11 and the adsorption layer 12 being rolled up from the inside to the outside. The corrugation of the spacer element 11 results in free-flow channels 13 between the adsorption layer 12 and the spacer element 11. The gas stream thus may flow through the adsorption element 10 between the end faces 14 without having to flow through a layer of material. Instead, in this embodiment it flows directly along an adsorption layer 12.

The shape of the adsorption element 10 need not necessarily be round because of being rolled up, but instead it may also be oval or designed to approximate a polygon. The contact surfaces between the adsorption layer 12 and the spacer element 11 may be joined together adhesively or may be simply clamped in a friction-locked manner. If there is adhesive bonding, this need not be provided on all contact surfaces but instead there may be bonding only at individual points, depending on the strength requirement.

To stabilize the rolled-up adsorption element 10, an additional layer of a spacer element 11 may be wound around it, in which case this additional layer need not be corrugated. The cylindrical adsorption element 10 shown here is clamped in a housing ring 20 and can be inserted into a duct system provided for this purpose or it may itself be part of a duct or pipe system.

Figure 2:
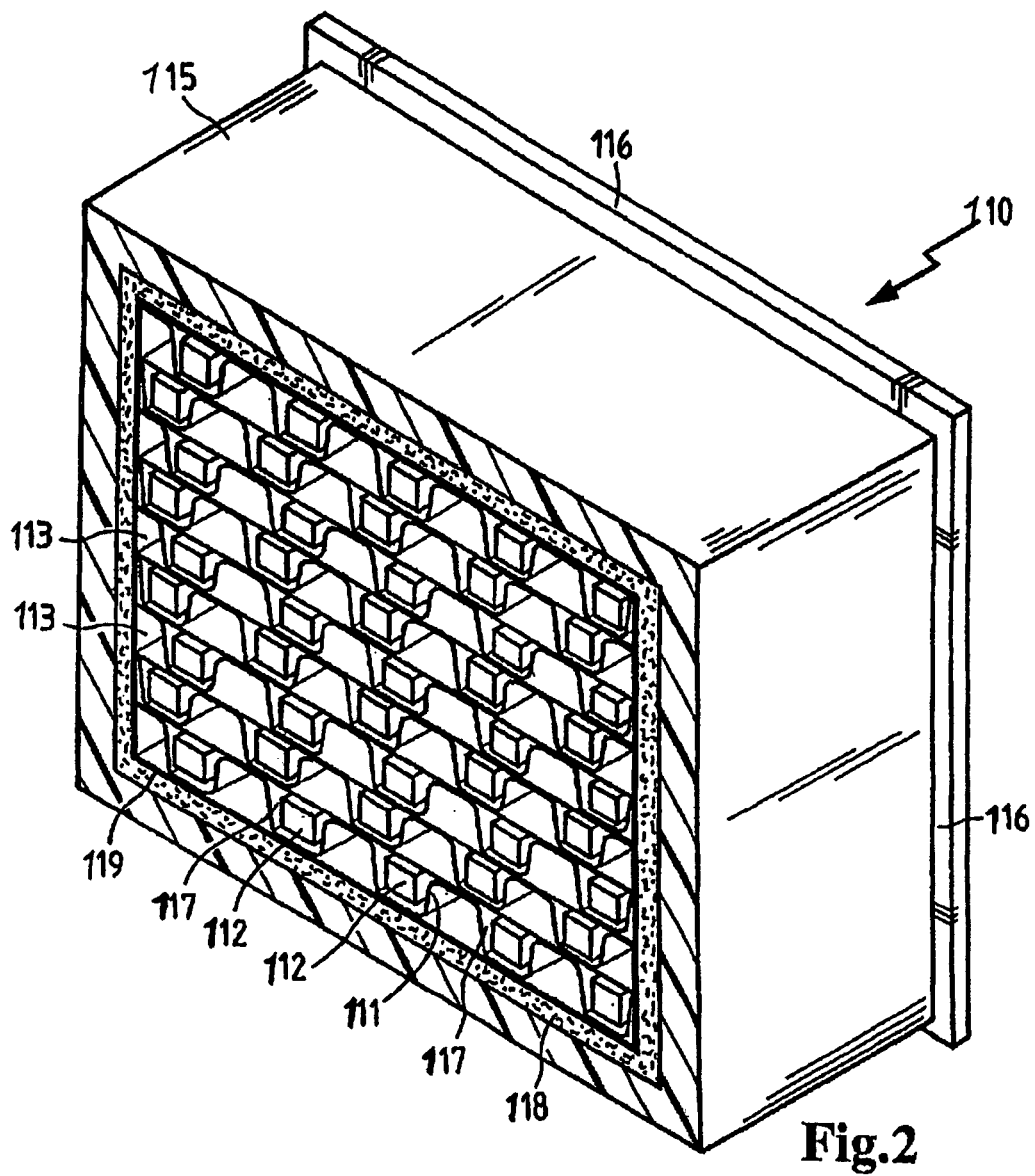
FIG. 2 is a perspective, fully sectional view of a layered adsorption element in the shape of a rectangular prism.

FIG. 2 shows an adsorption element 110 in a rectangular prism-shaped housing 115 with a flange 116. The housing 115 is provided for adaptation to an air guidance system (not shown here). Inside the housing 115, the adsorption layers 112 are arranged in pockets 117 formed by the spacer elements 111. The layered adsorption layers 112 stacked one above the other in rows are stacked with an offset spacing over the entire flow cross section of the housing 115. The free-flow channels 113 are formed by the spacings of the pockets 117 aligned in rows. All the entire adsorption layers 112 are surrounded by surrounding layers 119 to assume a reinforced form before mounting in the housing 115.

A sealing medium 118 is applied between the surrounding layers 119 and the housing 115 to establish a secure and tight connection between the adsorption layers 112 and the housing 115. The end faces of the pockets 117 are sealed so that the gas stream passes through the channels 113 which have free flow and does not pass directly by the adsorption layers 112. The adsorption and desorption of hydrocarbons thus take place through the spacer element 111. In this case the spacer elements 111 must be designed with perforations or as elements open to gas diffusion over the entire area.

Figure 3:
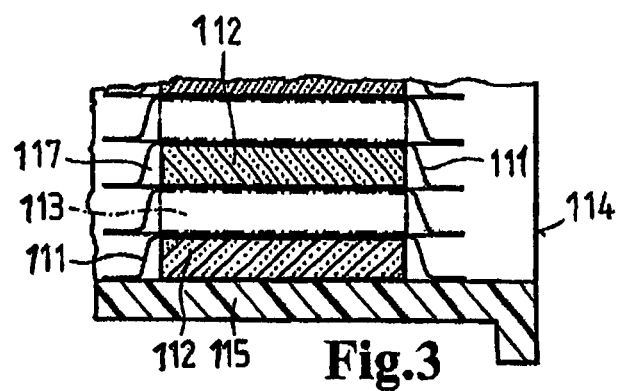
FIG. 3 is a partial detail view of a layered adsorption element.

FIG. 3 shows a partial sectional view in the longitudinal direction according to FIG. 2 in which the components corresponding to those in FIG. 2 are identified by the same reference numerals. The adsorption layers 112 are surrounded by the pockets 117 formed by the spacer elements 111. The layers of the spacer element 111 are brought together at the end faces 114 which may be adhesively bonded or welded at the connection points. In this example the adsorption layers 112 are directly adjacent the housing 115 and may, for example, be adhesively bonded directly to the housing.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of preventing atmospheric pollution by hydrocarbons from a return flow of gases through an intake tract of an internal combustion engine, said method comprising:

providing an adsorption element in said intake tract, said adsorption element having free flow channels with channel walls formed at least partially by a non-hydrocarbons adsorbing spacer element open to gas diffusion and by adsorption layers, the spacer element being disposed in the free flow channels between adjacent adsorption layers;

adsorbing hydrocarbon vapors on said adsorption layer from a return flow of gases from the engine through said intake tract; and desorbing adsorbed hydrocarbons from said adsorption layer into an intake air stream drawn through said intake tract to said internal combustion engine when said engine is operating and combusting the desorbed hydrocarbons in said engine.

2. A method according to claim 1, wherein said at least one spacer element is formed by at least one layer of paper, nonwoven web or synthetic resin material.

3. A method according to claim 1, wherein the adsorption layer contains activated carbon or a zeolite.

4. A method according to claim 1, wherein the adsorption layer is wrapped in at least one spacer element, and at least one of the layers is pleated.

5. A method according to claim 1, wherein the adsorption element has end faces that are sealed.

6. A method according to claim 1, wherein at least one adsorption layer is formed to a pleated shape by pressing between two spacer elements.

7. An adsorption element according to claim 1, wherein the adsorption element is surrounded by a sheathing, and said sheathing forms a housing which can be mounted in the intake tract of the internal combustion engine.

8. An adsorption element according to claim 1, wherein the adsorption layer is formed by a material which compensates for the temperature influence on the adsorption capacity.

* * * * *

UNITED STATES PATENT AND TRADEMARK OFFICE
CERTIFICATE OF CORRECTION

PATENT NO. : 7,618,479 B2
APPLICATION NO. : 11/097361
DATED : November 17, 2009
INVENTOR(S) : Jens Sohnemann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this

Twenty-sixth Day of October, 2010

David J. Kappos
*Director of the United States Patent and Trademark Office*